United States Patent [19]

McCarthy

[11] Patent Number: 4,484,175
[45] Date of Patent: Nov. 20, 1984

[54] ROTARY BEACON

[75] Inventor: Richard M. McCarthy, Bridgeport, Conn.

[73] Assignee: R. E. Dietz Company, Syracuse, N.Y.

[21] Appl. No.: 429,987

[22] Filed: Sep. 30, 1982

[51] Int. Cl.³ .............................................. B60Q 1/52
[52] U.S. Cl. ...................................... 340/84; 340/50; 340/87; 350/99; 362/35; 362/170; 362/269
[58] Field of Search .................. 340/84, 90, 50, 81 R, 340/87, 82, 83, 321, 332, 331; 362/35, 170, 157, 171, 269; 350/99, 100, 288, 289, 302

[56] References Cited

U.S. PATENT DOCUMENTS

| | | | |
|---|---|---|---|
| 2,762,994 | 9/1956 | Kennelly | 340/84 |
| 4,104,615 | 8/1978 | Hunter | 340/84 |
| 4,320,385 | 3/1982 | Bleiweiss et al. | 340/84 |
| 4,387,362 | 6/1983 | Gosswiller | 340/84 |

Primary Examiner—Donnie L. Crosland
Attorney, Agent, or Firm—St. Onge, Steward, Johnston & Reens

[57] ABSTRACT

A rotary beacon for use in emergency equipment where a turntable carrying electric lights rotates with respect to the base.

16 Claims, 8 Drawing Figures

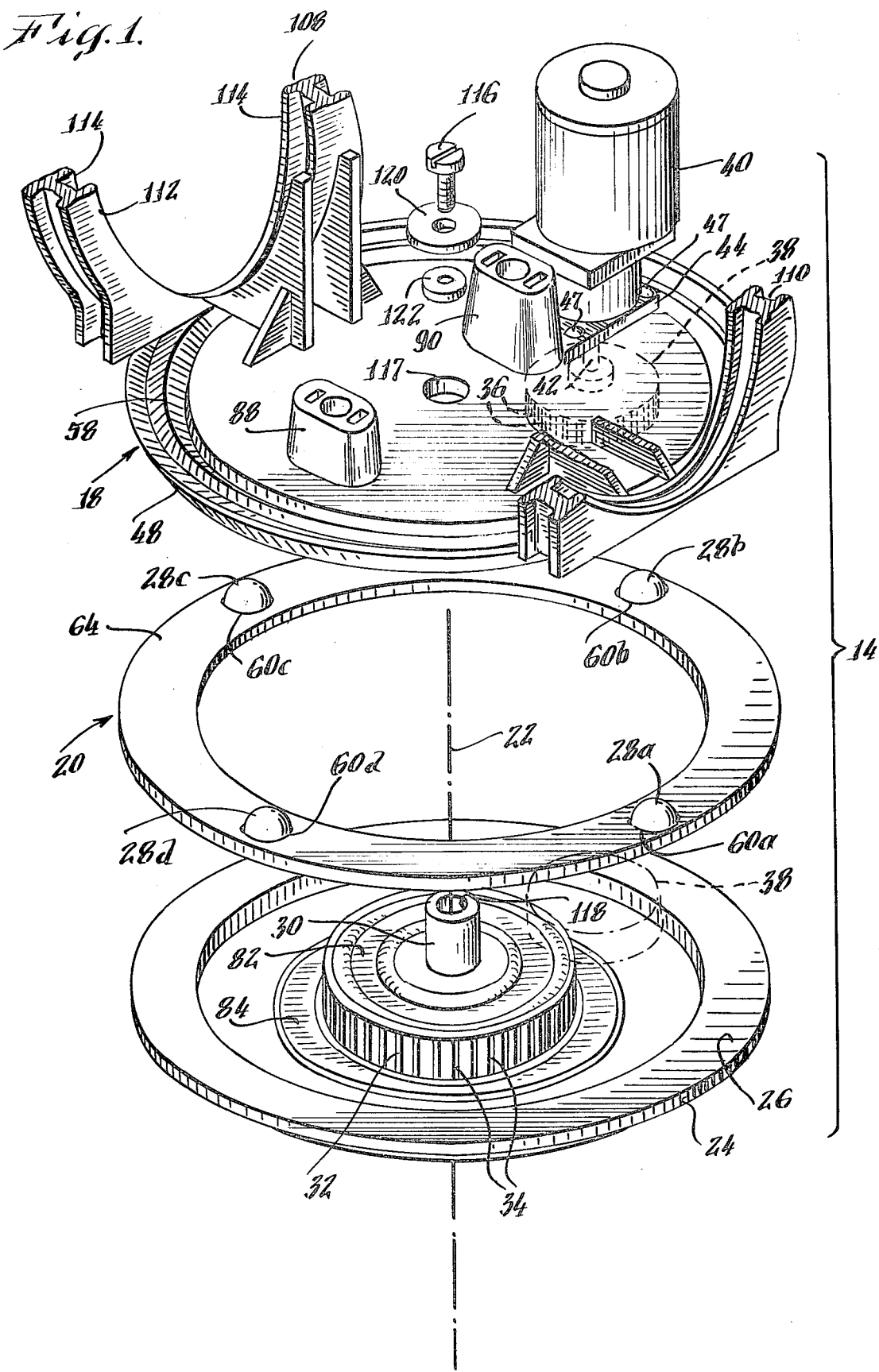

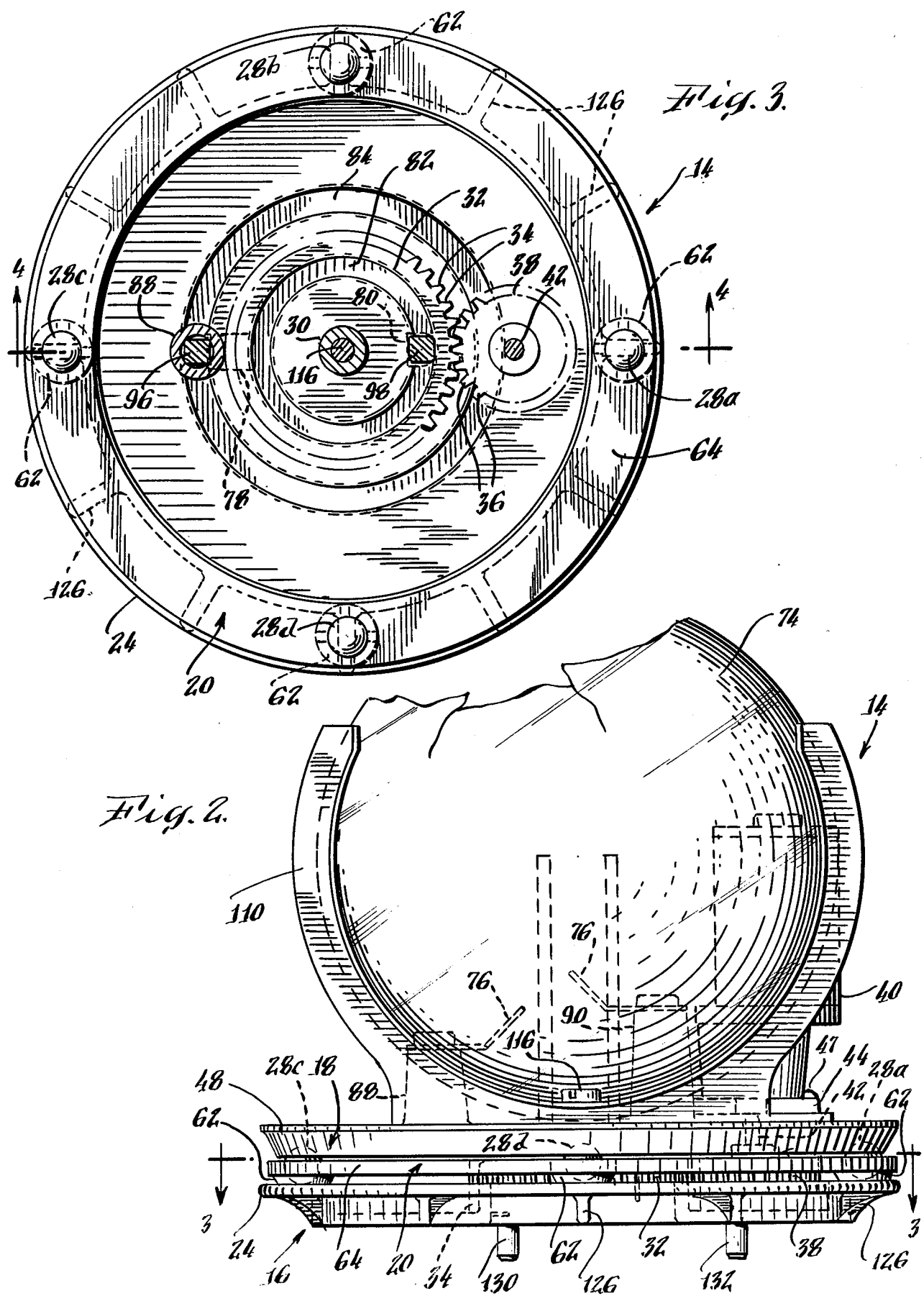

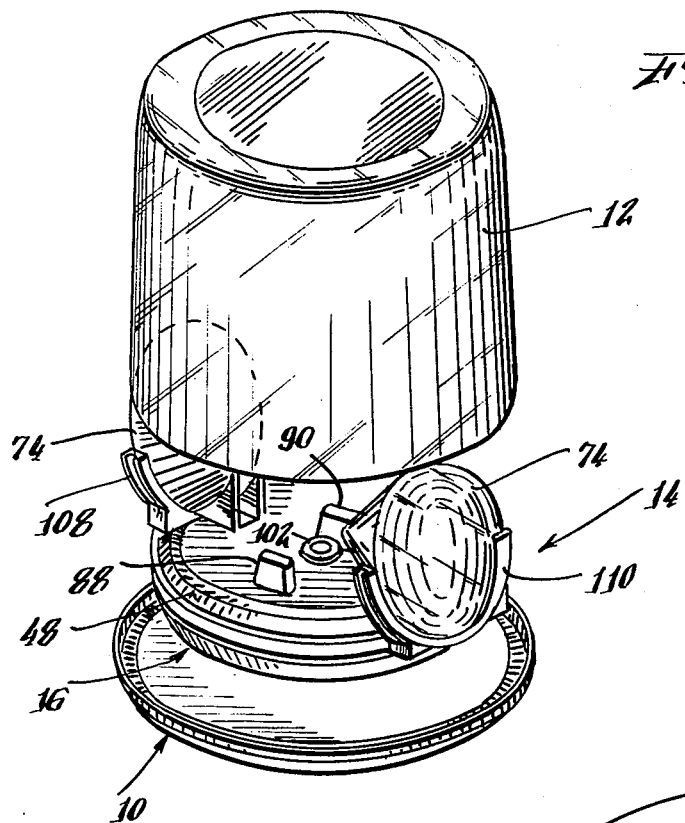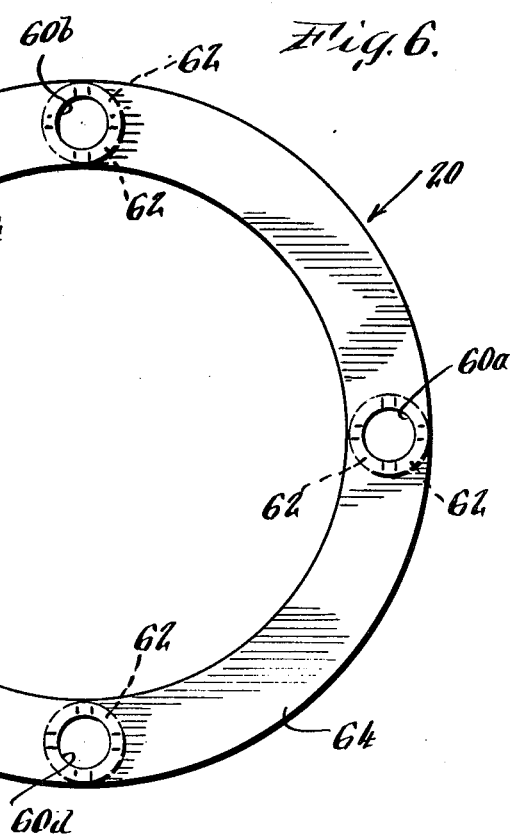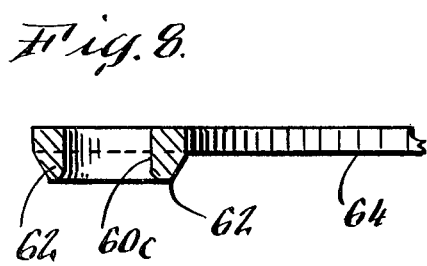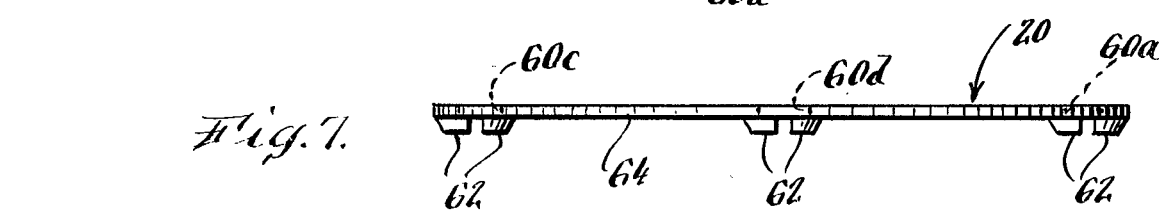

ROTARY BEACON

BACKGROUND OF THE INVENTION (1) Field of the Invention

The present invention relates to rotary beacons for use in emergency equipment, in, more particularly, a rotary beacon of the type having at least one electrically powered light which rotates with respect to the bottom housing of the beacon.

(2) Description of the Prior Art

A conventional rotary beacon includes at least one, and generally two electrically powered lights that are mounted for rotation on a base of the beacon. The lights and the base are sealed in a cover which is transparent or translucent, the cover being referred to in the art as a "dome". Although there are many types of rotary beacons, a typical rotary beacon includes a base that supports an electrical light housing for rotation with respect to the base. The light housing rotates on a central spindle secured to the base. The housing with the lights secured thereto rotates at a relatively high speed, for example, approximately 60 rpm. After continued use of the beacon, a radial bearing that supports the housing on the spindle may become worn and required replacement. Moreover, the bearing is subjected to relatively high stresses, and rotates at relatively high speeds because it is located at or near the axis of rotation of the housing and the bearing may become worn over a period of time.

It is an object of the present invention to provide an improved rotary assembly for use in a rotary beacon, and, more particularly, it is an object of the present invention to provide an improved bearing structure that is simplified and has a relatively long useful life. It is a further object of the invention to provide a bearing that has its ball bearings located in spaced apart relation to the axis of rotation to thereby reduce the linear speed of the ball bearings and therefore prolong the life of the beacon. It is a further object of the invention to provide a rotary assembly that has a reduced number of parts, a portion of which can be formed from a molded polymeric material.

SUMMARY OF THE INVENTION

In accordance with the present invention, an improved rotary beacon is provided. The rotary beacon includes a conventional bottom housing that is covered by a dome. A rotary assembly for supporting and rotating at least one and typically two electrically powered lights is provided and is secured to the bottom housing of the beacon. It should be understood that a rotary assembly according to the present invention is particularly suitable for use in a beacon of the type having a dome in which a single rotary assembly according to the present invention can be used in bar-type equipment. By bar-type equipment, it is meant the type of equipment including a plurality of rotary assemblies mounted on an elongate bottom housing and covered with an elongate dome, in such bar-type equipment is typically used atop emergency vehicles such as police cars and ambulances and the equipment may include loud speakers.

A rotary assembly in accordance with the present invention includes a base having an axis extending perpendicular with respect to the base. A generally horizontal circular ring is fixed with respect to the base and has its center coincident with the axis of the base. The ring includes a circular race upon which bearings, such as conventional ball bearings, roll in a circular path on the race.

A generally horizontal turntable is mounted on the base for rotation about the axis of the base. A generally horizontal circular upper ring is fixed with respect to the turntable and has its center incident with the base axis. The upper ring includes a circular race facing the race of the base ring. The upper ring is located above and in spaced relation to the lower ring.

The rotatable bearings, such as for example, ball bearings, support the turntable for rotation on the base. The bearings contact and roll in a circular path on the races to permit the turntable to rotate with respect to the base with a reduced amount of friction. The bearings are separated circumferentially about their circular path by a circular separator ring having a plurality of apertures for receiving each bearing. At least one of the races includes a mechanism for maintaining the bearings in the circular path, such mechanism preferably comprising a V-shaped groove in the face of the upper ring.

The rotary assembly includes a mechanism secured to the turntable for carrying one or more electric lights. This carrying mechanism preferably comprises two generally U-shaped support brackets for receiving sealed beam light bulbs. However, it should be understood that the type of electric light used in the rotary beacon may be selected for a given application and, thus, the mechanism for carrying the light will be selected to receive a particular type of light bulb.

The rotary assembly includes an electrically powered mechanism for rotating the turntable with respect to the base. In accordance with one aspect of the invention, the mechanism comprises a circular gear surface centered on the base axis, the gear surface having a plurality of teeth.

A drive gear having a plurality of teeth in meshing engagement with the teeth of the circular gear surface is provided. The drive gear is mounted on the turntable for orbital rotation about the circular gear surface upon rotation of the drive gear. An electrical motor is fixed to the turntable and rotates the drive gear.

In order to power the lights and the motor for driving the turntable, electricity is transmitted between the base and the rotating turntable. In accordance with one aspect of the invention, the rotary assembly includes inner and outer annular contact discs that are secured to the base and that are electrically conductive. The turntable includes for each of the discs a mechanism for making an electrical connection between the disc and the contacts on the turntable which transmits power to the lights and the electrical motor. In accordance with a preferred aspect of the present invention, the mechanism for making an electrical connection with each of the discs comprises, for each of the discs, an electrically conductive member slidable vertically with respect to a housing in the turntable. The conductive member is biased downwardly into contact with its respective disc as the turntable rotates.

In accordance with another aspect of the invention, the base, the circular gear surface, the lower ring including its race are molded from a polymeric material and are formed integrally with each other. The turntable including the upper ring in its race are molded from polymeric material and the ring is integral with the turntable. As can be appreciated, by molding the base and the turntable, the number of parts of the rotary assembly is reduced substantially thereby reducing the costs of the parts and the time necessary to assemble them.

Additional aspects of the present invention and those discussed above will be apparent from the detailed description of the invention with reference to the drawings, which follows.

BRIEF DESCRIPTION OF THE DRAWINGS

FIG. 1 is a perspective exploded view of a rotary assembly for a beacon;

FIG. 2 is a side plan view of the rotary assembly shown in FIG. 1 after it has been assembled;

FIG. 3 is a sectional and plan view along the plane 3—3 of FIG. 2;

FIG. 5 is an exploded perspective view of a beacon with a rotary assembly as shown in FIGS. 1-4 positioned between a dome and a bottom housing of the beacon;

FIG. 6 is a plan view of the ball bearing separator ring for the rotary assembly shown in FIGS. 1-4;

FIG. 7 is a side plan view of the separator ring shown in FIG. 6; and

FIG. 8 is a sectional view along the plane 8—8 of FIG. 6.

DETAILED DESCRIPTION OF THE INVENTION

Figure 4:
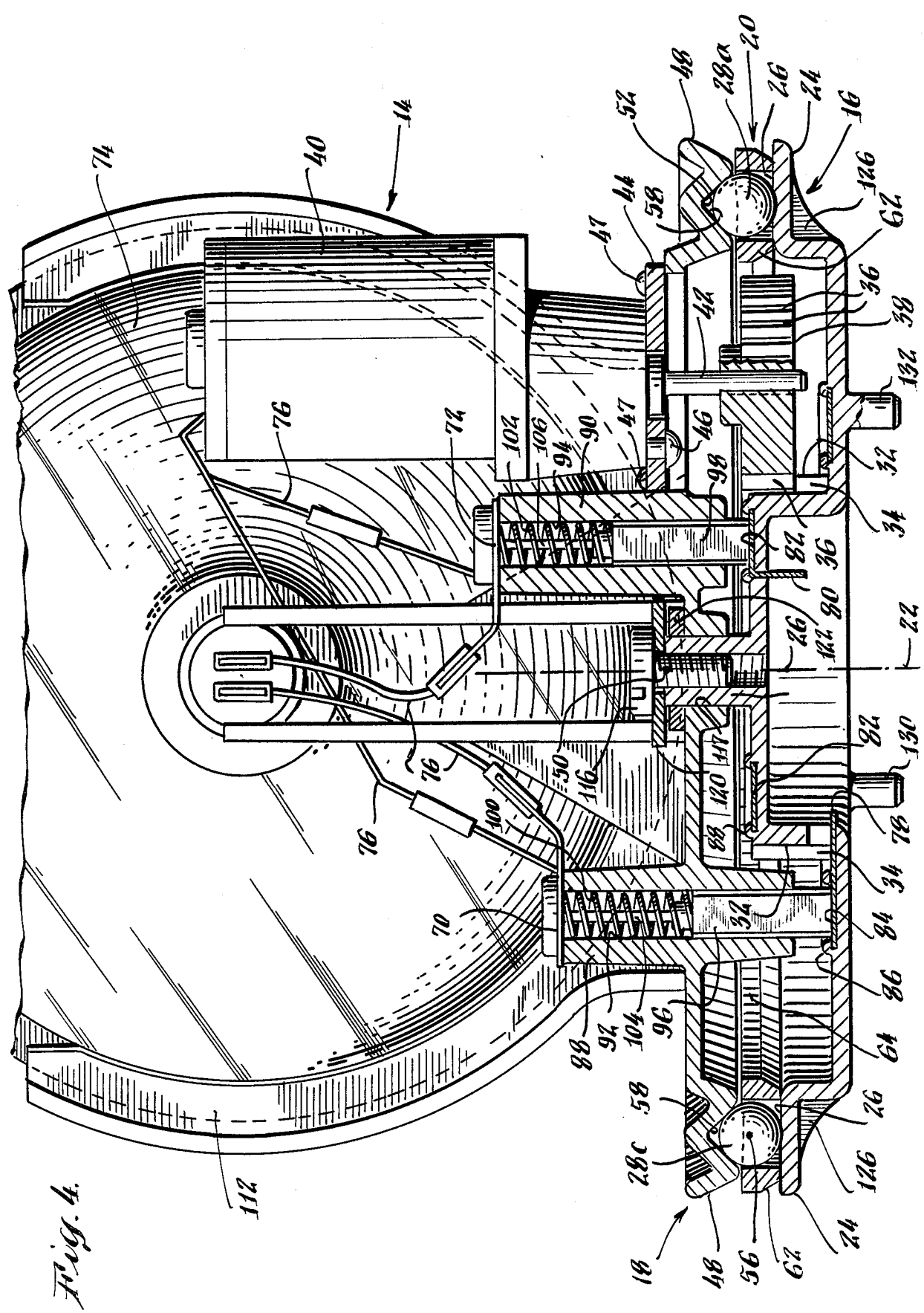
FIG. 4 is a sectional view along the plane 4—4 of FIG. 3.

Referring in particular to FIG. 5, a rotary beacon in accordance with the present invention includes a bottom housing 10 which may be placed atop a car roof or on another surface. A transparent or translucent dome 12 is secured over the bottom housing and transmits light from a rotary assembly 14 which is located inside the assembled beacon. The rotary assembly of the present invention will now be described with respect to FIGS. 1-4.

Referring in particular to FIG. 1, the rotary assembly includes a base 16, a turntable 18 and a separator ring 20. The base 16, which extends generally horizontally, includes a central axis 22 that is perpendicular with respect to the base. The base includes a horizontal circular lower ring 24 having its center coincident with the axis 22. The ring includes a circular race 26 for supporting ball bearings 28a, 28b, 28c and 28d. The base also includes a central cylindrical spindle 30 upon which the turntable 18 is mounted.

The base includes a circular gear surface 32 having a plurality of teeth 34 engaging the teeth 36 on drive gear 38. It should be noted that the drive gear 38 is as shown twice in FIG. 1. In the upper portion of FIG. 1, the drive gear 38 is associated with turntable 18. When the turntable is assembled onto the base (as shown in FIG. 4), the drive gear is in the position shown in the lower portion of FIG. 1 wherein the teeth 36 of the drive gear 38 are in meshing engagement with the teeth 34 of the circular gear surface 32. The drive gear rotates orbitally about the circular gear surface when driven by motor 40 via shaft 42. It should be understood that the motor 40 is fixed with respect to turntable 18 and is mounted on a motor plate 44 by a fastener 46 (see FIG. 4). The plate 44 is secured to the turntable by one or more fasteners 47.

Referring to FIGS. 1 and 4, the turntable, which is positioned generally horizontally, is mounted on the base 16 for rotation about axis 22. A generally horizontal circular upper ring 48 is provided. Ring 48 has its center 50 coincident with axis 22 and includes a circular race 52 which faces the race 26 of ring 24. The upper ring 48 is located above and in spaced relation to lower ring 24. Ball bearings 28a, 28b, 28c and 28d support the turntable 18 for rotation on base 16. The base bearings are in contact with and roll in a circular path 56 on the races 26 and 52. The upper race 48 includes a V-shaped groove 58 for maintaining the bearings on the cirular path 56.

Referring to FIGS. 1, 4 and 6-8, the separator ring 20 includes a plurality of apertures 60a, 60b, 60c and 60d for receiving respectively ball bearings 28a, 28b, 28c and 28d. The separator ring, which is annular in shape, includes a relatively flat upper surface 64 which is preferably out of contact with ring 48 as the turntable rotates, although it should be understood that the separator ring 20 may occasionally contact the ring 48. As shown particularly well in FIGS. 4, 7 and 8, a plurality of protrusions 62 project outwardly from the bottom surface 64 of separator ring 20, and are in contact with the race 26, which is a relatively flat annular surface. The protrusions 62 are preferably smoothly rounded to reduce friction between them and the ring 24 and to permit rotation of the separator ring 20 with respect to the race 26.

As best shown in FIG. 4, the turntable includes a pair of electrical contacts 70 and 72 for powering electric motor 40 and the electrical lights 74. Electrical connection is made with contacts 70 and 72 via wires 76. The base 16 includes electrical contacts 78 and 80 which are connected to a source of electrical power. The base, as shown particularly well in FIGS. 1 and 4, includes inner and outer contact discs 82 and 84 which are connected respectively to contacts 80 and 78. The discs 82 and 84 are held in place by circumferential beads 86.

Turntable 18 includes two housings 88 and 90 which each have a cylindrical housing 92 and 94 containing electrical contact members 96 and 98. Electrical contact members 96 and 98 which are preferably conventional brushes, are slidable vertically within housings 92 and 94 and are biased downwardly by springs 100 and 102 into physical contact with discs 84 and 82. As the turntable rotates on the base, an electrical connection between brushes 96 and 98 with discs 84 and 82 is maintained and the lights 74 and the electric motor 40 are powered. Shunt wires 104 and 106 transmit electricity from brushes 96 and 98 to contacts 70 and 72.

As shown particularly well in FIG. 1, the rotary assembly includes a mechanism 108 and 110 for carrying electric lights 74 (see lights 74 as shown in FIGS. 4 and 5). The turntable includes at least one carrying mechanism 108 and preferably four carrying mechanisms 108 and 110 for carrying two electric lights. As shown in FIG. 4, the carrier comprises an arcuate member 112 that is slightly larger than one half of a circle. The carrier 112 is made from plastic and when a conventional bulb as shown in FIG. 4 is forced downwardly into slots 114, the carrier is spread apart to receive and retain the bulb 74.

Referring once again to FIGS. 1 and 4, the turntable includes a central hole 117 that has a diameter slightly larger than the outer diameter of spindle 30 of the base. When the rotary assembly is constructed, the spindle 30 fits within hole 117 and screw fastener 116 is screwed into the hollow cylindrical portion 118 of spindle 30. A washer 120 is positioned over the spindle 30 and prevents the turntable from inadvertently separating from its base. The device also includes a slip washer 122 positioned between washer 120 and the upper surface of the turntable. The slip washer 122 is preferably made of a material having a low coefficient of friction, such as, for example, polytetrafluoroethylene.

As can be appreciated by reference to FIG. 2, the rotary assembly of the present invention has very few parts which may be manufactured by plastic molding techniques. The base 16 can be formed in a molding operation wherein the ring 24, the cylindrical gear surface 32, and spindle 30 are integral with each other and are formed simultaneously in a simple molding operation. Moreover, even the ribs 126 for supporting the ring 24 may be integrally molded with the base. As can be appreciated, the integration of many parts which are individual components in conventional rotary assembly into a single unit reduces the part cost as well as the time that would ordinarily be spent to assemble the numerous parts. Likewise, the turntable including ring 48 and housings 92 and 94 are preferably formed in a single step molding operation so as to reduce the number of parts.

The rotary assembly in accordance with the present invention may be used in a rotary beacon having two lights which rotate within a semi-spherical dome as shown in FIG. 5. The base 16 includes pins 130 and 132 which may be received in apertures in the bottom housing 10. It should be understood, however, that the rotary beacon can be used in various types of lighting structures including bar-type emergency equipment that includes typically two or more rotary assemblies.

It should be understood that although specific embodiments of the invention have been described herein in detail, such description is for purposes of illustration only and modifications may be made thereto by those skilled in the art within the scope of the invention.

I claim:

1. A rotary assembly for use in a beacon for supporting and rotating at least one light powered by an electric power source, the rotary assembly comprising:
    a generally horizontal base having an axis extending perpendicularly with respect to the base;
    a generally horizontal circular lower ring fixed with respect to said base and having its center coincident with said axis of said base;
    a generally horizontal turntable mounted on said base for rotation about said axis;
    a generally horizontal circular upper ring fixed with respect to said turntable and having its center coincident with said axis, said upper ring being located above and in spaced relation to said lower ring, each said ring including a circular race facing the race of the other ring;
    a plurality of rotatable bearings supporting said turntable for rotation on said base, said bearings being in contact with and rolling in a circular path on said races, said bearings being separated circumferentially about said circular path, at least one said race including means for maintaining said bearings in said circular path;
    means for maintaining said circumferential separation of said bearings;
    means secured to said turntable for carrying said electric light;
    electrically powered means for rotating said turntable with respect to said base; and
    said turntable having electrical contacts for transmitting electricity to said light, said base having contacts for connection to said electrical power source, said turntable contacts being electrically connected to said base contacts as said turntable rotates.

2. A rotary assembly according to claim 1 wherein said means for maintaining said bearings in said circular path comprises a groove extending the circumference of at least one said race, said groove receiving said bearings and preventing radial movement of said bearings during rotation of said turntable.

3. A rotary assembly according to claim 2 wherein said means for maintaining said separation of said bearings comprises a circular separator ring extending between the races, said ring including a plurality of apertures each for receiving a bearing and maintaining said bearing in spaced circumferential position with respect to the other bearings.

4. A rotary assembly according to claim 3, wherein said bearings are spherical balls, and said apertures in said separator ring each having a diameter slightly larger than its respective ball for permitting free rotation of its respective ball.

5. A rotary assembly according to claim 1, wherein said means for rotating comprises:
    a circular gear surface centered on said axis, said gear surface having a plurality of teeth;
    a drive gear having a plurality of teeth in meshing engagement with said circular gear surface, said drive gear mounted on said turntable for orbital rotation about said circular gear surface upon rotation of said drive gear; and
    an electric motor fixed to said turntable for rotating said drive gear, said motor being electrically connected to said contacts of said turntable.

6. A rotary assembly according to claims 5 and 1 and further including inner and outer annular contact discs secured to said base, said inner disc being electrically connected to one said contact of said base and said outer contact disc connected to another said contact of said base, said contact discs being electrically conductive, said turntable further including for each said contact disc a means for making electrical connections between said disc and said turntable contacts as the turntable rotates with respect to the base.

7. A rotary assembly according to claim 6 wherein said means making electrical connections comprises for each said contact disc an electrically conductive member slidable vertically with respect to a housing in said turntable, said conductive member being biased downwardly into contact with its respective disc as said turntable rotates.

8. A rotary assembly according to claim 7 wherein said housing comprises a hollow cylinder and wherein said electrically conductive mechanism comprises a brush, said brush being biased downwardly by spring means positioned in said housing.

9. A rotary assembly according to claim 5 wherein said base, said lower ring, said race and said central gear are integral with each other and comprise a molded polymeric material.

10. A rotary assembly according to claim 9 wherein said turntable, said upper ring, and said race are integral with each other and comprise a molded polymeric material.

11. A rotary assembly according to claim 10 wherein said housing for said electrically conductive members are integrally molded with said turntable, said upper ring, and said race.

12. A rotary assembly according to claim 3 wherein said means for maintaining said circumferential separation of said bearings comprises an annular disc having said plurality of apertures for receiving said ball bearings, and for each said aperture a plurality of protrusions extending vertically downwardly from said annular disc, each said protrusion having a smoothly rounded point for contacting the said race of said lower ring, said race of said lower ring having a substantially flat surface, said race of said upper ring including a V-shaped groove for maintaining said circular path of said ball bearings.

13. A rotary assembly according to claim 1 wherein said base includes a central axle extending vertically upwardly from the base, said turntable including a central aperture having a diameter slightly larger than the diameter of said axle, said aperture receiving said axle to permit free rotation of said turntable thereon.

14. A rotary assembly according to claim 13 wherein said axle comprises a hollow cylinder, said axle having an opening at the upper end thereof for receiving for fastening the turntable to the base means, said fastening means protruding radially outwardly from said axle to prevent said turntable from being lifted from said base.

15. A rotary assembly according to claim 5 wherein said central gear comprises a sprocket gear having a plurality of teeth and wherein said drive gear comprises a sprocket gear having a plurality of teeth meshed with the teeth of said central gear.

16. A bottom housing a beacon for placement on an object such as an automobile or the like comprising:

a generally horizontal base secured to said bottom housing and having an axis extending perpendicularly with respect to the base;

a generally horizontal circular lower ring fixed with respect to said base and having its center coincident with said axis of said base;

a generally horizontal turntable mounted on said base for rotation about said axis;

a generally horizontal circular upper ring fixed with respect to said turntable and having its center coincident with said axis, said upper ring being located above and in spaced relation to said lower ring, each said ring including a circular race facing the race of the other ring;

a plurality of rotatable bearings supporting said turntable for rotation on said base, said bearings being in contact with and rolling in a circular path on said races, said bearings being separated circumferentially about said circular path, at least one said race including means for maintaining said bearings on said circular path;

means for maintaining said circumferential separation of said bearings;

means secured to said turntable for carrying at least one electric light;

electrically powered means for rotating said turntable with respect to said base;

said turntable having electrical contacts for transmitting electricity to said light, said base having contacts for connection to said electrical power source, said turntable contacts being electrically connected to said base contacts as said turntable rotates; and a light transparent dome secured to said bottom housing and encompassing said base and said turntable.

* * * * *